Nov. 21, 1950 G. C. PAXTON 2,530,626
NAILING CHUCK ACTUATING MECHANISM
Filed Jan. 18, 1949 3 Sheets-Sheet 1

INVENTOR
G. C. Paxton
BY
ATTORNEYS

Nov. 21, 1950  G. C. PAXTON  2,530,626
NAILING CHUCK ACTUATING MECHANISM
Filed Jan. 18, 1949  3 Sheets-Sheet 2
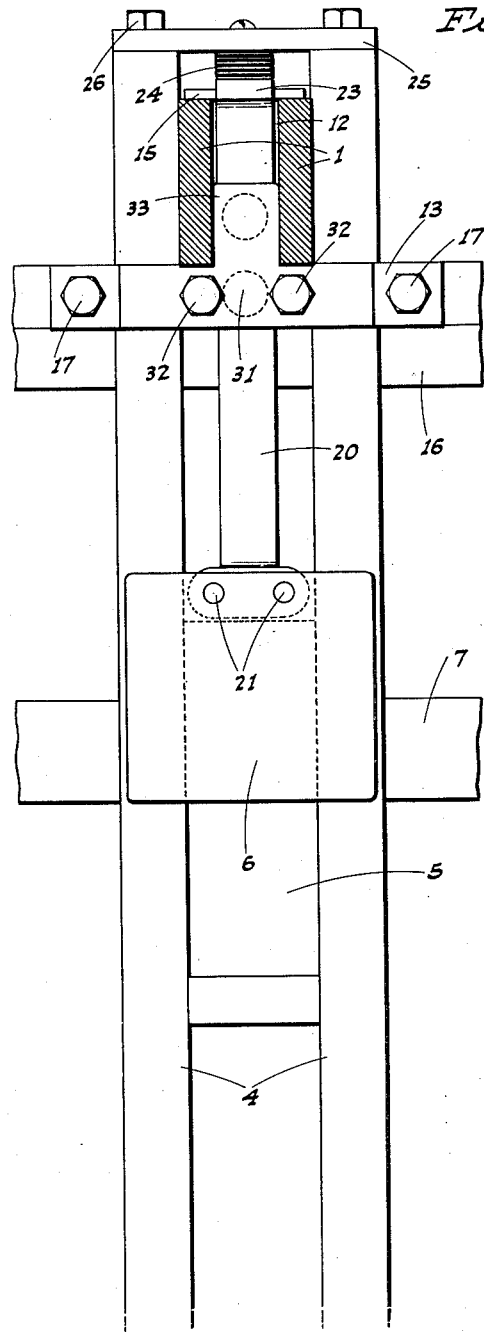
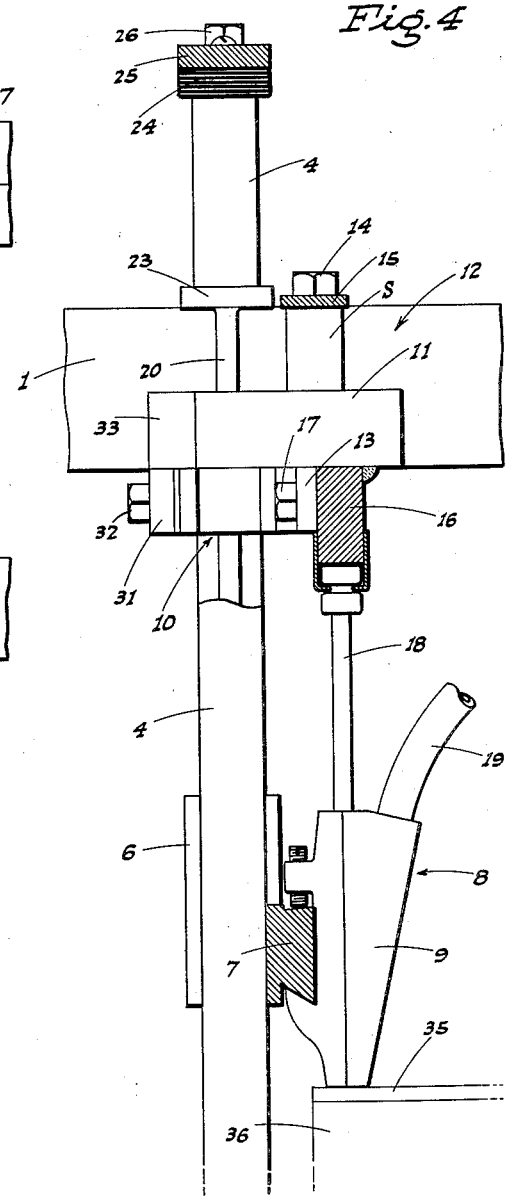
INVENTOR
G. C. Paxton
BY
ATTORNEYS Nov. 21, 1950  G. C. PAXTON  2,530,626
NAILING CHUCK ACTUATING MECHANISM
Filed Jan. 18, 1949  3 Sheets-Sheet 3

INVENTOR
G. C. Paxton
BY
ATTORNEYS

Patented Nov. 21, 1950

2,530,626

UNITED STATES PATENT OFFICE 2,530,626

NAILING CHUCK ACTUATING MECHANISM

Gerald C. Paxton, Sanger, Calif., assignor to General Nailing Machine Corporation, Sanger, Calif., a corporation of California Application January 18, 1949, Serial No. 71,437

4 Claims. (Cl. 1—10)

This invention is directed to, and it is an object to provide, an improved nailing chuck actuating mechanism for a power driven, automatic box nailing machine; the present invention being directed to a modification of the nailing chuck actuating mechanism shown in copending application, Serial No. 751,741, filed June 2, 1947, on "Nailing Machine."

In machines, as above, a reciprocating, top driving bar acts to (a) lower the nailing chucks into the work; (b) then drive the nailing rods downward; and (c) return such chucks and nailing rods to an elevated initial or starting position. In step (c) of the prior embodiment the nailing rods were first pulled upward a predetermined distance with respect to the chucks, and the latter then followed, which caused the chucks to remain lowered or in contact with the work longer than necessary.

It is therefore an object of this invention to provide an actuating mechanism, in a nailing machine, which is operative to return the nailing chucks from the lowered working position to elevated starting position with a motion which begins simultaneously with the start of the upward stroke of the top driving bar, whereby the nailing chucks clear the work rapidly, as is desirable.

Another object of the invention is to provide an actuating mechanism, as above, which includes, in novel assembly, a friction drag unit on the top driving bar of the machine cooperating with a push-pull bar upstanding from the vertically movable chuck unit; such friction drag yieldably gripping the push-pull bar so as to cause the aforesaid simultaneous upward motion of the chuck unit with the top driving bar.

An additional object of the invention is to provide an improved and simplified nailing chuck actuating mechanism; such mechanism being designed for ease and economy of manufacture, as well as facility of servicing and maintenance.

It is also an object of the invention to provide a nailing chuck actuating mechanism which functions smoothly, and positively.

A further object of the invention is to provide a practical and reliable nailing chuck actuating mechanism, and one which will be exceedingly effective for the purpose for which it is designed.

These objects are accomplished by means of such structure and relative arrangement of parts as will fully appear by a perusal of the following specification and claims.

In the drawings:

Fig. 3 is a fragmentary outer end elevation of the mechanism; the top driving bar being in section.

Fig. 4 is a fragmentary sectional elevation, similar to Fig. 1, but illustrates the mechanism part way through the down-stroke, and with the nailing chuck unit in box-lid engagement.

Figure 6:
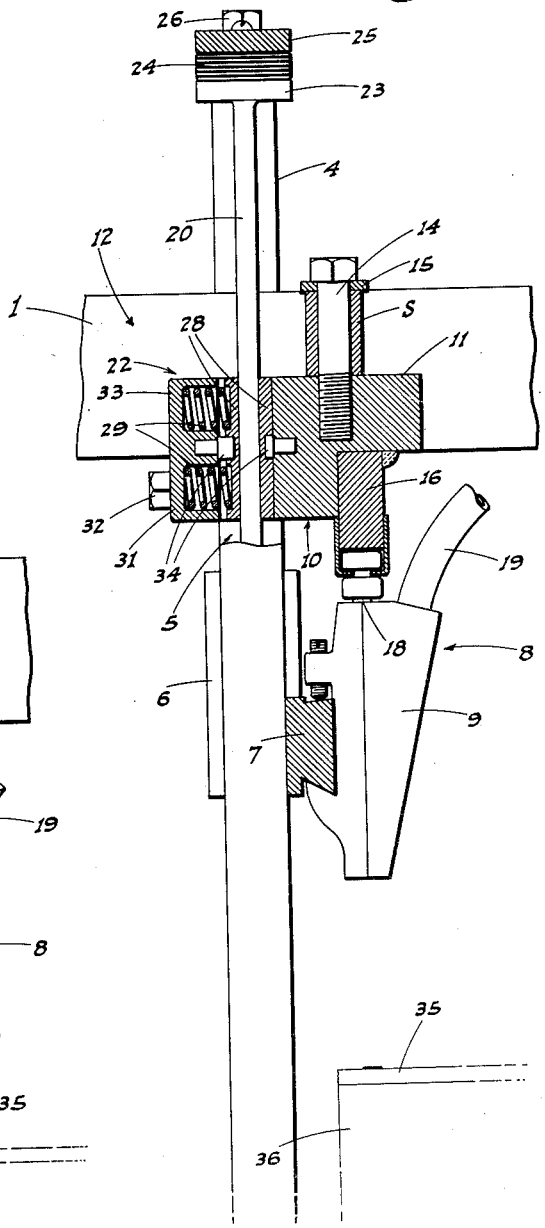

Fig. 6 likewise is a similar view, but shows the nailing chuck unit as being raised by the top driving bar.

Referring now more particularly to the characters of reference on the drawings, the novel, nailing chuck actuating mechanism is embodied in an automatic nailing machine of the type illustrated in the aforesaid copending application, Serial No. 751,741, and wherein such machine includes a top driving bar 1 which extends horizontally and transversely of the machine, being guided adjacent opposite ends between vertical guide bars 2. The top driving bar 1 is adapted to be reciprocated through a cycle which includes a downward stroke from an initially elevated position, followed by an upward or return stroke to said position; the reciprocating means including a connecting rod 3 attached to each end of the top driving bar 1.

Adjacent but inwardly of the guide bars 2 on each side of the machine, there is a vertically slotted post 4 wherein the slot is indicated at 5. A guided slide 6 runs in each slotted post 4 and such slide carries, on the inner side, a horizontal, lower cross bar 7 which extends lengthwise through the machine. Each lower cross bar 7 provides the mount for a nailing chuck unit, indicated generally at 8, and which nailing chuck unit includes a plurality of nailing chucks mounted in longitudinally spaced relation on the lower cross bar 7; one of said chucks being indicated at 9.

The present invention is directed to the actuating mechanism which is employed between the top driving bar 1 and the assembly of each guided slide 6 and nailing chuck unit 8 thereon. As the arrangement is identical on each side of the machine, a description of one actuating mechanism will suffice for both.

Each nailing chuck actuating mechanism comprises a locator and guide block 10 secured in connection with the top driving bar 1 above the nailing chuck unit 8; such locator and guide block 10 including a rectangular upper portion 11 which engages in locating relation in the vertical slot 12 with which said top driving bar 1 is formed; said bar being so slotted from top to bottom and for substantially its full length.

Additionally, the locator and guide block 10 includes opposed lateral extensions 13 which bear against the bottom of the top driving bar 1, and said block 10 is secured in place by a bolt 14 which extends through a cross plate 15 seated atop the bar 1; the bolt 14 passing through a spacer S and being threaded into the upper portion 11 of the block 10, fixedly securing the latter to said top driving bar 1 for travel therewith.

Inwardly of the lateral extensions 13 of block 10, the latter is fixed with an upper cross bar 16 which extends in the same direction as the lower cross bar 7; such upper cross bar 16 being affixed to the block 10 by suitable means, which may include cap screws 17 extending between the extensions 13 and said upper cross bar 16. The upper cross bar 16 is secured, on the under side, to downwardly projecting nailing rods which work into corresponding nailing chucks 9; one of said nailing rods being indicated at 18.

Nails are fed, conventionally, to each nailing chuck 9, through a flexible, nail-delivery tube 19; nails being introduced into such tube by a nail stripper (not shown).

The guided slide 6 is fitted, on top thereof and centrally of its ends, with an upstanding push-pull bar 20; such bar being secured at its lower end to the guided slide, as at 21. The upstanding push-pull bar 20 is disposed in the slot 5 of the slotted post 4, and extends upwardly through a friction drag unit, indicated generally at 22, formed in connection with the locator and guide block 10 in the manner hereinafter described.

Above the friction drag unit 22 the push-pull bar 20 is formed with a head 23 adapted to abut against a resilient bumper 24 on a cross head 25 on the slotted post 4, which cross head is held in place by cap screws 26.

The length of the push-pull bar 20 is such that the head 23 engages the resilient bumper 24 whereby to stop upward motion of the guided slide 6 and nailing chuck unit 8 some distance below the uppermost position of the top driving bar 1 and the upper cross bar 16; this for the purpose of withdrawing each nailing rod 18 from the corresponding nailing chuck 9 preparatory to a subsequent nailing operation. As the head 23 engages the resilient bumper 24, the stopping of the guided slide 6 and nailing chuck unit 8 is accomplished without any sudden jar. In this connection see Fig. 1 wherein the parts are illustrated in their elevated or starting positions.

The friction drag unit 22, through which the push-pull bar 20 engages in gripped but longitudinally yieldable relation, comprises the following structural arrangement:

The locator and guide block 10 is formed, in alinement with the slot 5 of the post 4, with a vertical rectangular slot 27, through which the push-pull bar 20 projects. Friction drag plates 28 are disposed in the slot 27 and bear against oposite sides of such push-pull bar 20. The outermost one of such friction drag plates 28 is urged toward the push-pull bar 20 by a pair of vertically spaced compression springs 29 seated in sockets 30 in a cap 31 secured to the block 10 by cap screws 32; such cap 31 extending transversely and including an upstanding portion 33 which engages, in locating relation, in the slot 12 of the top driving bar 1.

The friction drag plates 28 are held in the slot 27 against vertical displacement by means of locator pins 34.

The compression springs 29 are of sufficient strength to cause considerable friction drag between the plates 28 and the push-pull bar 20, but not sufficient drag to bind said bar against relative sliding through the friction drag unit 22.

Figure 1:
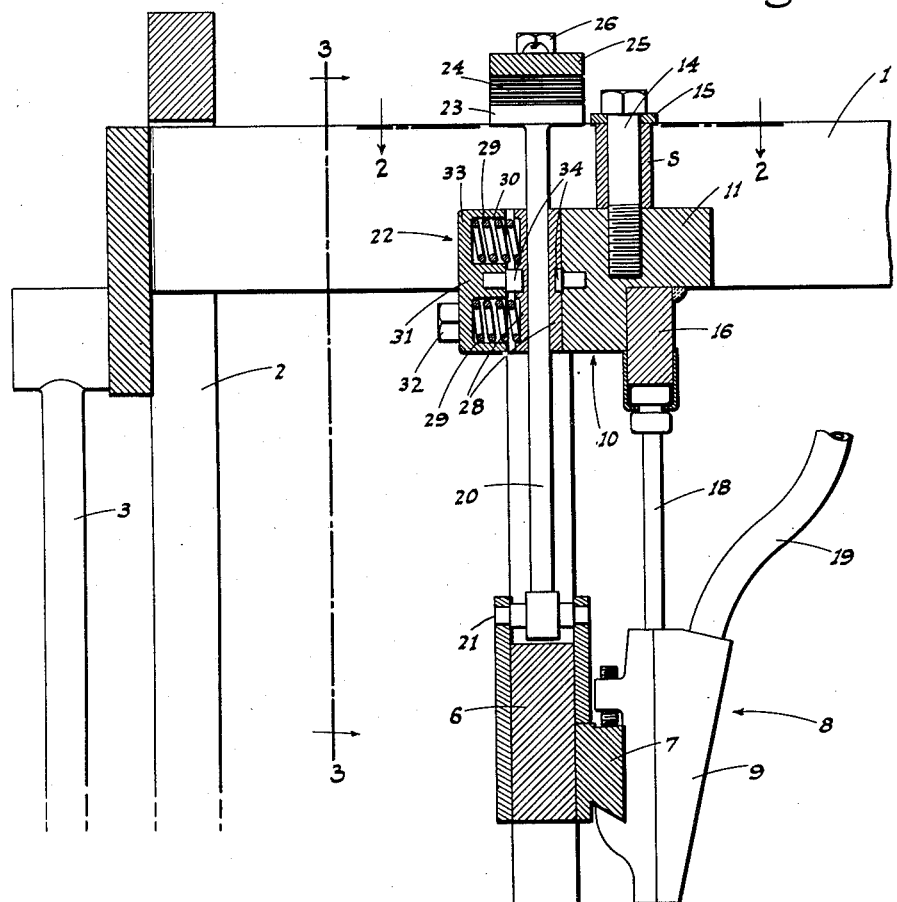
Fig. 1 is a fragmentary sectional elevation showing the actuating mechanism as connected between the top driving bar, and one of the nailing chuck units of an automatic nailing machine; the parts being shown in their elevated or starting positions.
Figure 2:
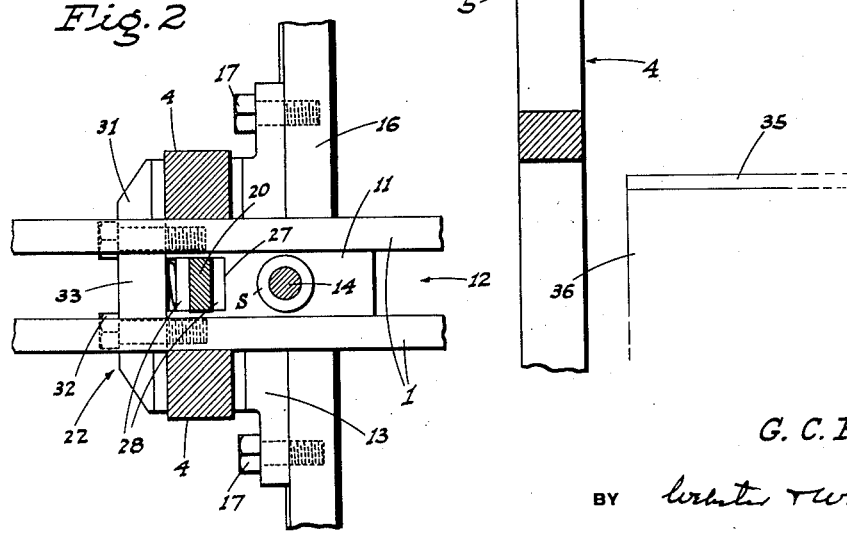
Fig. 2 is a fragmentary sectional plan view on line 2—2 of Fig. 1.

The operating of the above described nailing chuck actuating mechanism is as follows:

With the parts in the position of Fig. 1, the top driving bar 1 first moves with a downward stroke, which results in the guided slide 6 and nailing chuck unit 8 thereon moving downwardly under the influence of the push-pull bar 20 until the chucks 9 of said unit 8 rests on the lid or other part 35 on a box 36, and which lid or part is to be nailed to said box. This position of the parts is shown in Fig. 4. Up to this point the push-pull bar 20 has had no relative motion through the friction drag unit 22.

Figure 5:
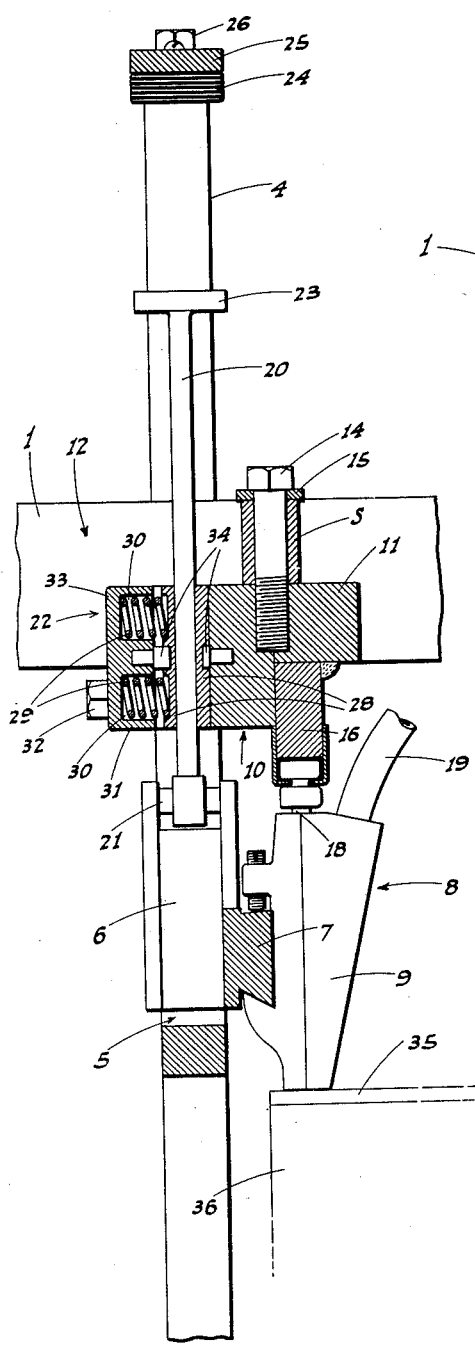
Fig. 5 is a similar view, but shows the mechanism at the lower end of the downward stroke, illustrating the adjacent nailing or hammer rod as driven downwardly into the corresponding nailing chuck.

However, upon engagement of the nailing chuck unit 8 with the work, such as a lid 35, and which occurs before completion of the downward stroke of the top driving bar 1, the friction drag unit permits continued further downward movement by said top driving bar 1 whereby to further lower the cross bar 16 and to drive each of the nailing rods 18 into the corresponding nailing chuck 9 so that a nail is driven through the lid 35 into the end of the box 36. The top driving bar 1 is now at the end of its downward stroke, and the parts are now in the position illustrated in Fig. 5, and wherein the friction drag unit 22 is engaging the lower end portion of the push-pull bar 20.

Immediately upon the top driving bar 1 starting its upward or return stroke, the friction drag unit 22, gripping the push-pull bar 20 adjacent its lower end portion, carries the guided slide 6 and nailing unit 8 immediately and simultaneously in an upward direction, rapidly elevating the chucks 9 from the work. This is desirable in an automatic nailing machine in order to permit of rapid withdrawal of the work and replacement of the next work.

After the nailing chuck unit 8 has been raised, with the return or upward stroke of the driving bar 1, to the initial or starting position of said unit, the head 23 on the push-pull bar 20 strikes the resilient bumper 24, preventing further upward travel of the push-pull bar 20, and the nailing chuck unit 8. At this moment the parts are in the position shown in Fig. 6.

Thereafter, with continued upward travel of the top driving bar 1, to complete its upward stroke, the friction drag unit 22 moves upwardly along the push-pull bar 20 against the drag imposed by the compression springs 29, and at the same time the nailing rods 18 are withdrawn upwardly from the nailing chucks 9 to starting position.

With the above described nailing chuck actuating mechanism, including the friction drag unit 22 working in cooperation with the push-pull bar 20, said mechanism is operative to actuate the nailing chuck unit 8 smoothly and effectively through a cycle which comprises the steps of moving such nailing chuck unit 8 downwardly into engagement with the work; then driving the nailing rods 18 through the nailing chucks 9; immediately raising the nailing chuck unit to its starting position; and finally withdrawing the nailing rods 18 upwardly to their starting position. The effect of this cycle is to cause upward escape of the nailing chuck unit 8 from the work at the earliest possible moment.

For lidding over-filled boxes, wherein it is necessary to bow the lid at the time of nailing the latter, the mechanism is of substantial value, for the reason that the friction drag unit can be adjusted so that a relatively great but finally yieldable pressure is imparted by the nailing chuck units to the ends of the box lid 35.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a nailing machine, a supporting frame, a driving bar mounted in said frame for reciprocating movement, a nailing rod fixed to the driving bar, a nail chuck unit disposed in co-operating relation with the nailing rod for effecting a nailing operation upon movement of the driving bar in one direction, a frictional connection between the nail chuck unit and the driving bar effective to carry the chuck unit with the driving bar upon movement of the latter in either direction, such connection being yieldable upon the chuck unit engaging a stop whereby to permit the driving bar to then continue its movement independently of the chuck unit.

2. A machine as in claim 1 in which the frictional connection comprises a bar fixed at one end on the chuck unit, spring pressed drag plates supported on the driving bar, the chuck unit bar projecting through the plates in frictional sliding contact therewith with its other end free.

3. A machine as in claim 2 wherein said stop is supported on said frame, the free end of the chuck unit bar being engageable with the stop when the latter has traveled a predetermined distance with the driving bar in one direction.

4. A machine as in claim 3 in which the last named stop includes a resilient bumper.

GERALD C. PAXTON.

No references cited.